(No Model.) 2 Sheets—Sheet 1.

J. S. DAVIS.
CLUTCH.

No. 267,064. Patented Nov. 7, 1882.

WITNESSES
Wm A Skinkle
Jos. S. Latimer

INVENTOR
John S. Davis.
By his Attorneys.
Baldwin, Hopkins & Peyton.

N. PETERS, Photo-Lithographer, Washington, D. C.

(No Model.) 2 Sheets—Sheet 2.

J. S. DAVIS.
CLUTCH.

No. 267,064. Patented Nov. 7, 1882.

WITNESSES
Wm A. Skinkle
Jos. S. Latimer

INVENTOR
John S. Davis.
By his Attorneys
Baldwin, Hopkins & Peyton.

UNITED STATES PATENT OFFICE.

JOHN S. DAVIS, OF TOLEDO, OHIO, ASSIGNOR TO THE TOLEDO MOWER AND REAPER COMPANY, OF SAME PLACE.

CLUTCH.

SPECIFICATION forming part of Letters Patent No. 267,064, dated November 7, 1882.

Application filed September 18, 1882. (No model.)

*To all whom it may concern:*

Be it known that I, JOHN S. DAVIS, of Toledo, in the county of Lucas and State of Ohio, have invented certain new and useful Improvements in Clutches, of which the following is a specification.

My invention relates to improvements in pawl-and-ratchet clutch mechanism of the class applicable chiefly to gearing—such as used in harvesters for driving cutters or rakes, or both—and by which the driven mechanism is automatically thrown out of action by reversing the direction of rotation of the driving mechanism.

The main object of my invention is to provide simple means by which the clutch may be set to act, or to be inoperative when rotated in one direction by its driving mechanism, without (when the clutch is set for action) interfering with the automatic throwing out of action of the clutch by reversing the direction of rotation of its driving mechanism.

The subject-matter deemed novel will hereinafter be distinctly claimed.

The accompanying drawings represent a suitable application of my improvements to a harvester, such parts only of the harvester being shown as are deemed requisite to a proper illustration of one way of applying my invention to use, my improvements in whole or in part being applicable to any suitable mechanism.

Figure 1:
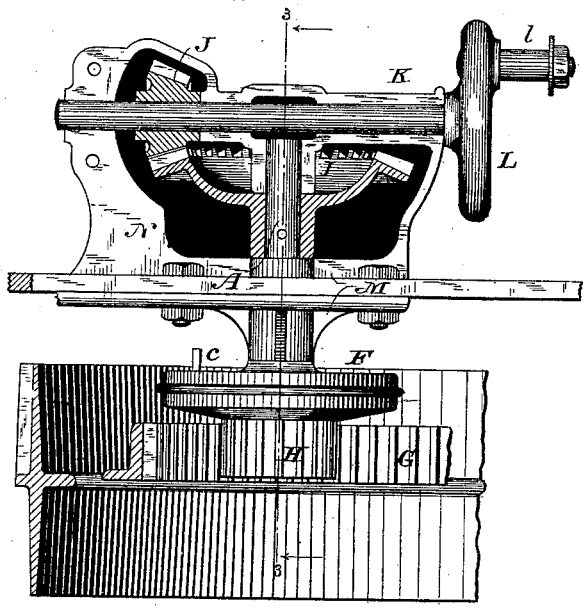
Figure 3:
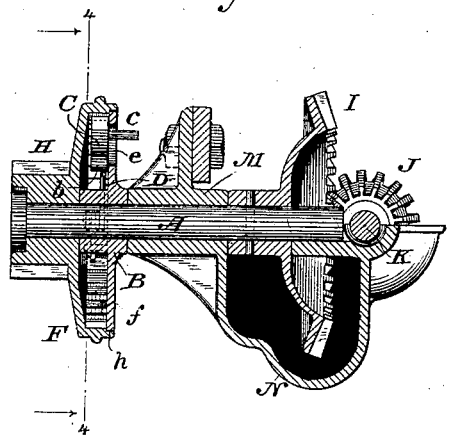
Figure 2:
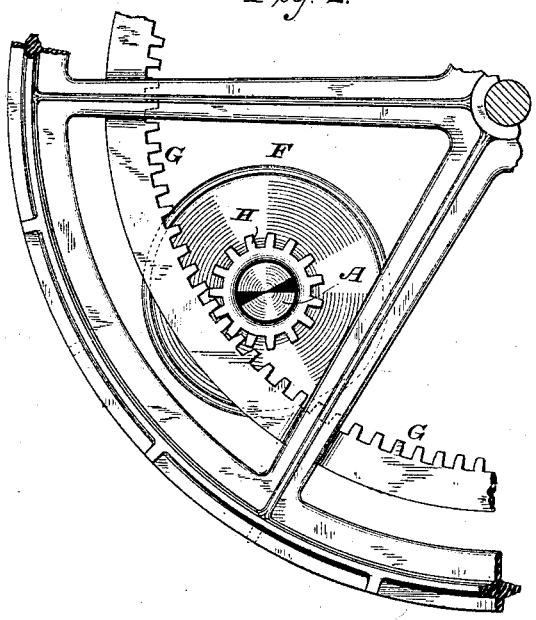
Figure 4:
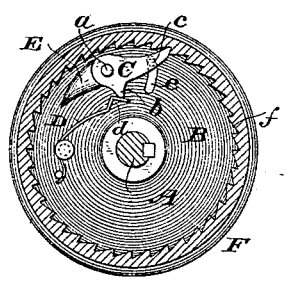
Figure 5:
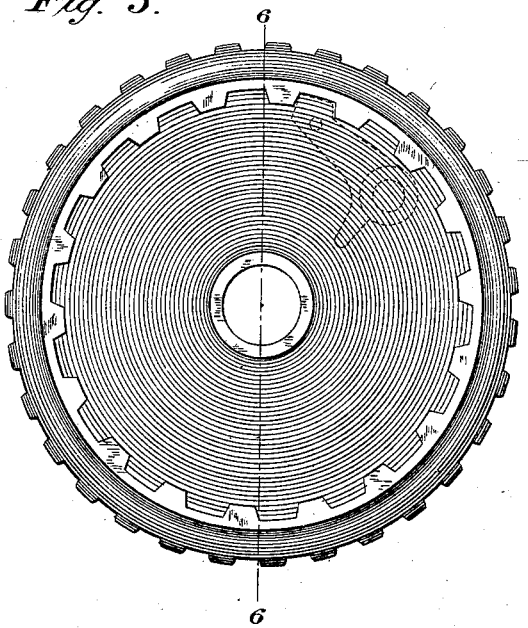
Figure 6:
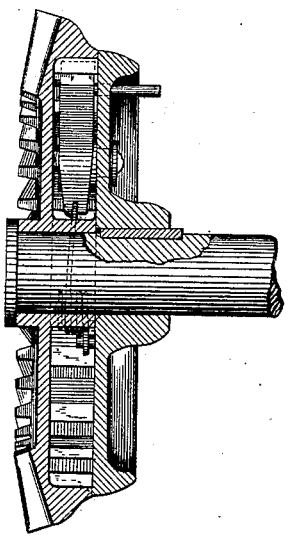
Figure 7:
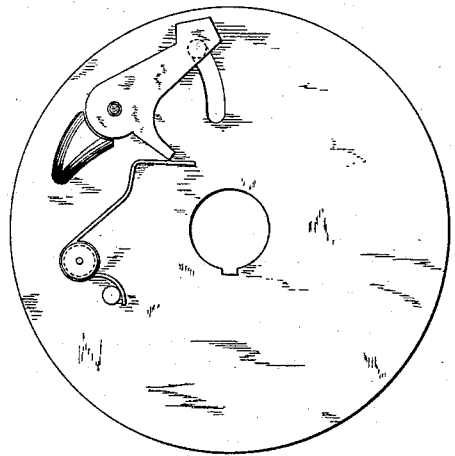

Figure 1 is a view, partly in plan and partly in section, showing a portion of the driving-wheel of a harvester and the cutter-actuating mechanism driven therefrom; Fig. 2, a side elevation. Fig. 3 is a view in section on the line 3 3 of Fig. 1. Fig. 4 is a view, partly in section on the line 4 4 of Fig. 3 and partly in elevation, showing the inner face, or side next the ratchet, of the pawl-carrier. Figs. 5, 6, and 7 are views representing a slightly-modified form of clutch mechanism. Fig. 5 shows the clutch mechanism detached from its shaft. Fig. 6 shows the mechanism in place upon its shaft, in section on the line 6 6 of Fig. 5; and Fig. 7, a view of the pawl-carrier detached, showing its inner face with the pawl and spring in place.

Referring first to Figs. 1 to 4, inclusive, a clutch-carrying shaft, A, is shown as provided with a fixedly attached or keyed hubbed plate or disk-wheel, B, which carries a spring-actuated pawl, C, pivoted at $a$, and having a short side arm or lateral lug, $b$, slightly in advance of the pivot and projecting inwardly or toward the center of the carrier B. A spring, D, suitably mounted on the pawl-carrier B, bears against the pawl-lug $b$, and is provided near its free end with an abrupt curve or angular shoulder, $d$. By bending the spring into the shape shown its normal action—that of bearing at or near its free end and outside its shoulder upon the pawl-lug to yieldingly hold the pawl with its nose rocked outward—is not interfered with, while yet the spring has imparted to it the additional function of holding the pawl with its nose rocked inward when by suitable means the pawl-lug has been caused to pass over the incline or shoulder $d$, and is presented to the spring inside of its shoulder or between its shoulder and pivot. In this way, as will be more apparent from the description farther on to be given, a rotated ratchet, F, mounted loosely on the clutch-carrying shaft A, becomes clutched with or is unclutched from the shaft, according to whether the bent end of the spring outside of the shoulder or the shoulder itself acts upon the pawl-lug. A curved slot, $e$, in the pawl-carrier serves to accommodate a pin or pawl adjuster, $c$, fastened to the pawl near its nose. By means of this pin the pawl may be rocked on its pivot to properly adjust its lug relatively to the spring. An abutment or bearing projection, E, on the pawl-carrier serves to relieve the pawl-pivot of strain, as the heel of the pawl works against this abutment.

The ratchet F is suitably rotated by the driving-wheel gear G and a pinion, H, and is formed by a circular plate having a peripheral flange provided with internal ratchet-teeth $f$. As shown, the pinion H and the circumferentially-flanged ratchet-toothed plate are cast in one piece, the pinion being loosely mounted on the shaft A so as to locate the ratchet near the end of the shaft or outside of the pawl-carrier B, which fits within the ratchet-plate, the peripheral flange of this plate being formed with a shoulder, $h$, to constitute an annular recess for the pawl-carrier. In this way the pawl-and-ratchet mechanism is completely protected. The shaft A and the driven gearing I J, with a crank-shaft, K, and the crank-wheel L and wrist-pin l, are mounted in suitable way in bearings in the frame M and gear-casing N.

The harvester-cutters are to be connected with the clutch-actuated mechanism by a pitman in well-known way, which it is not necessary here to describe, as the improvements herein claimed are not restricted to any particular application of the clutch mechanism, and do not include features of a harvester, my invention relating to a clutch *per se* of general application.

It is obvious that power may be applied to the crank-wheel L to drive the pinion H and any suitable mechanism connected therewith or that, instead of the pinion H, a band-wheel may be passed over the ratchet, or a crank attached thereto, to actuate the shaft A, without the pinion and driving-wheel.

In Figs. 5, 6, and 7 the pawl-carrier is not let into the ratchet-plate as above described, and a combined bevel-gear and ratchet the equivalent of the pinion H and ratchet F is employed. The pawl-nose and ratchet teeth are also modified in construction. When power is applied either to the shaft or to the bevel-gear when constructed as shown by Fig. 6, the operation is precisely as before explained, the pawl either "clicking" or slipping over the teeth or engaging them, according to the direction of rotation, when the spring is acting as shown in Fig. 7, or being held out of action by the engagement with its lug of the incline or shoulder of the spring.

I claim as of my own invention—

1. The combination of the pawl provided with the lug, the plate to which it is pivoted, and the spring provided with the incline or shoulder and acting on the pawl-lug to hold the pawl in either of two positions, according to adjustment, substantially as hereinbefore set forth.

2. The combination of the rotated ratchet, the shaft upon which it is loosely mounted, the pawl-carrier fastened to said shaft, the adjustable pawl, and the spring by which the pawl is held in or out of action, substantially as hereinbefore set forth.

3. The combination of the slotted pawl-carrier, the shaft to which it is keyed, the rotated ratchet-plate having the internally-toothed peripheral flange and loosely mounted on said shaft, the pawl, the pin secured thereto and projecting through the slot of the pawl-carrier, the pawl-lug, and the spring provided with the incline or shoulder and acting on the pawl-lug, substantially as and for the purpose hereinbefore set forth.

4. The combination of the clutch-carrying shaft, the pawl-carrier fastened thereon, the adjustable pawl, the spring by which the pawl is held in or out of action, according to adjustment, the ratchet loosely mounted on the clutch-carrying shaft, and the pinion H, or its specified equivalent, substantially as and for the purpose hereinbefore set forth.

In testimony whereof I have hereunto subscribed my name.

JOHN S. DAVIS.

Witnesses:
P. Y. CHAMPION,
G. W. HUMPHREY,
H. S. PERKINS.